April 6, 1965   E. P. SUNDHOLM   3,176,624
OUTLET CHECK VALVE MEANS FOR A GREASE GUN HEAD
Filed Feb. 1, 1963
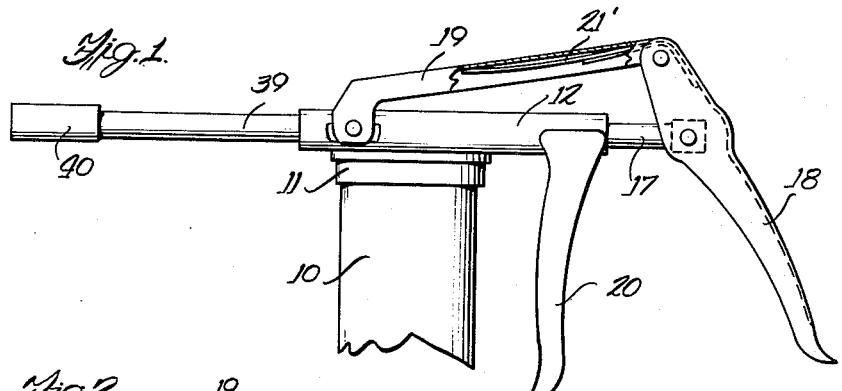
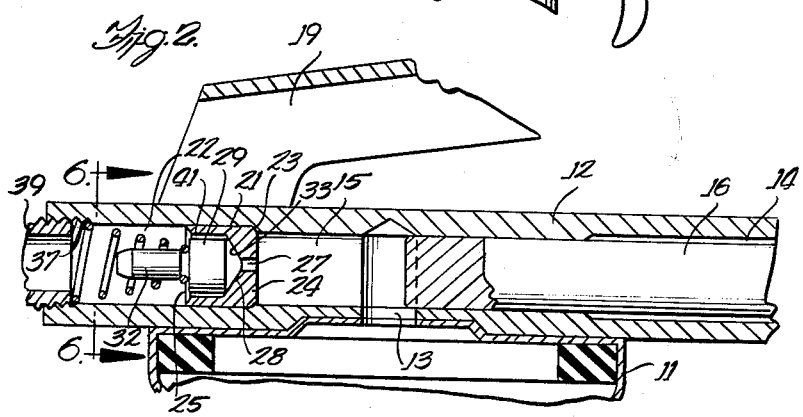
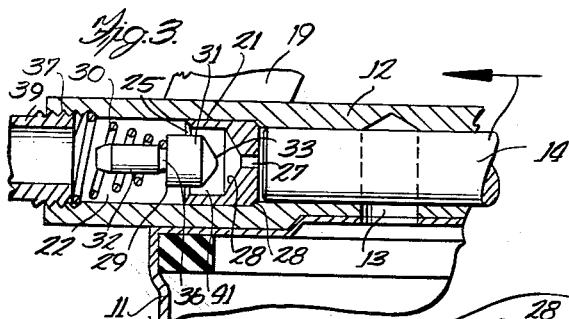
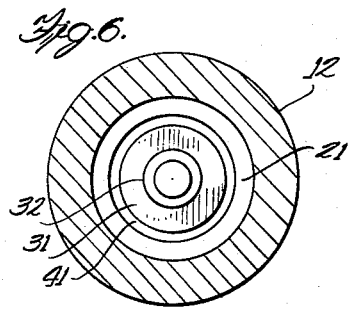
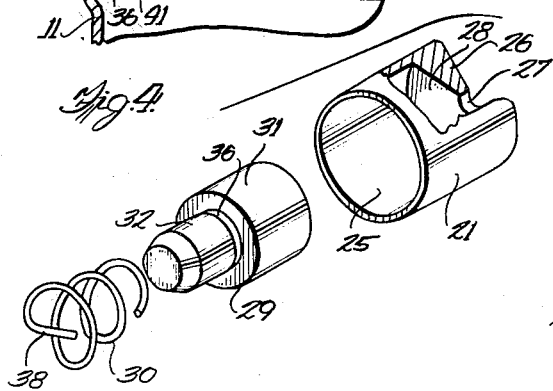
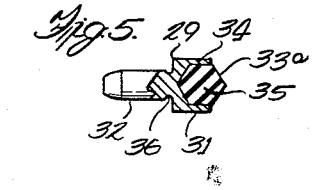
Inventor
Edwin P. Sundholm

United States Patent Office 3,176,624
Patented Apr. 6, 1965

3,176,624
OUTLET CHECK VALVE MEANS FOR A
GREASE GUN HEAD
Edwin P. Sundholm, Albert City, Iowa, assignor to Southwest Grease & Oil Co., Inc., Wichita, Kans., a corporation of Kansas
Filed Feb. 1, 1963, Ser. No. 255,635
4 Claims. (Cl. 103—153)

This invention relates to an outlet check valve means for a grease gun head. The outlet check valve assembly of this invention is particularly adapted for use in combination with a hand-operated or lever-operated grease gun which provides a dispensing head including a high pressure cylinder.

It is an object of the present invention to provide an improved outlet check valve assembly for incorporation in a grease gun head. More specifically, it is an object to provide an outlet check valve assembly which when employed in combination with a grease gun head provides increased dispensing capacity by improving the suction filling of the high pressure cylinder and thereby increasing the quantity of grease dispensed per stroke of the piston. Still another object is to provide an outlet check valve assembly of the character described which facilitates the suction filling of the high pressure cylinder and the dispensing of grease at low temperatures down to as low as 20° below zero. A further object is to provide an outlet check valve assembly which can readily be assembled in a grease gun head, and which permits easy removal of the valve and compression spring elements for inspection and replacement. A still further object is to provide an outlet check valve in combination with a high pressure cylinder of the grease gun head which provides for substantially complete ejection of the grease from the high pressure cylinder with each stroke of the piston, thereby providing a positive displacement action which eliminates air locks due to air entrapped in the grease. Further objects and advantages will be indicated in the following detailed specification.

The invention is shown in an illustrative embodiment in the accompanying drawing, in which:

FIGURE 1 is a side elevational view of a grease gun of the kind which is adapted for use in combination with the outlet check valve assembly of this invention;

FIGURE 2 is an enlarged sectional view showing part of the grease gun head of FIGURE 1 and particularly the outlet check valve assembly therein;

FIGURE 3 is a view similar to FIGURE 2 except that the plunger in the high pressure cylinder is shown near the end of its dispensing stroke as it approaches the outlet check valve;

FIGURE 4 is a perspective view of the principal components of the check valve assembly showing the parts in separated relation;

FIGURE 5 is an enlarged longitudinal sectional view of a preferred form of the valve member; and FIGURE 6 is a transverse sectional view taken on line 6—6 of FIGURE 2 showing the relation of the valve and valve cage.

Looking first at FIGURE 1 there is shown a hand-operated grease gun having the usual barrel 10 for holding a supply of grease. Within the barrel there is provided a plunger assembly, such as the one described in my United States Patent No. 3,059,980, entitled "Grease Gun Plunger Assembly." Since a particular plunger assembly does not form a part of the present invention, it is not believed it will be necessary to further describe it herein. Its function is to assist in moving the grease toward the dispensing head on the front end of the barrel.

As shown in FIGURE 1, the dispensing head includes a front end cap 11 which is threadedly connected on the front end of barrel 10. The head also includes an elongated tubular body 12 which extends across the outside of cap 11 and is secured thereto by welding or other suitable procedure. For example, cap 11 and body 12 may be fused by resistance welding, such as projection welding, around the juncture between the grease inlet opening 13 and the connecting opening through cap 11, as shown in FIGURE 2.

Tubular body 12 provides a longitudinal bore 14 extending therethrough with an intermediate portion 15 of the bore providing a high pressure cylinder. The inlet end of cylinder 15 communicates with grease inlet 13, while the outlet end of the cylinder communicates with an outlet check valve assembly which will subsequently be described.

A piston 16 extends through bore 14 into the high pressure cylinder 15 for reciprocation therein between the inlet and outlet ends of the cylinder. The grease can thereby be forced out of the cylinder under pressures ranging up to 8,000 p.s.i. As the piston 16 advances towards the outlet end of the cylinder 15, it covers port 13 and from there on creates the desired pressure. On the return stroke when the piston is being retracted, it creates suction within cylinder 15 so that grease will be sucked into the cylinder 15 as the piston is withdrawn to a position opening port 13.

Any suitable means can be provided for actuating piston 16. In the illustration given, piston 16 is connected to a guide extension 17 which is pivotally connected at an intermediate point to handle 18. The upper end of handle 18 is pivotally connected to a link 19 which has its other end pivotally connected to the body 12. There is also provided a stationary handle 20 which is rigidly secured to the body 12. In the operation of the dispensing head, the hands of the operator are used to grasp the handles 18 and 20. By squeezing these handles, piston 16 is moved inwardly through bore 14. A leaf spring 21' is mounted within link 19 and extends downwardly into handle 18 to bias piston 16 to the retracted position shown in FIGURE 2 with the movable handle 18 in the position shown in FIGURE 1. After the dispensing stroke, the piston and movable handle thereby return to the proper position for the next dispensing stroke.

The assembly of handles 18 and 20 with link 19 and tubular body 12 is described more fully in my copending application Serial No. 192,396, filed May 4, 1962. Since the present invention is not directly concerned with the particular assembly of these components, it is not believed it will be necessary to further deescribe such assembly herein.

In accordance with the present invention, the outlet check valve means which is incorporated within tubular body 12 includes a hollow cylindrical valve cage 21 which is seated within the bore of tube 12 immediately beyond cylinder 15. In the illustration given, there is provided a bore portion 22 of slightly larger diameter than the cylinder bore portion 15, and an annular shoulder 23 is provided between the bore portion 22 and the cylinder bore 15. The shoulder 23 serves as an abutment or stop for positioning the cage 21. In the illustration given, cage 21 is provided with an inclined shoulder portion 24 whch engages the inclined shoulder 23. After cage 21 is seated within bore 22 in the position illustrated in FIGURES 2 and 3 of the drawing, the cage is locked in place by a swaging operation wherein a tool is inserted within cage 21 and the cage expanded against the inner wall of the bore portion 22.

Preferably cage 21 has an open end 25 facing away from the high pressure cylinder 15. The other end 26 of the cage is closed and provides a transversely-extending wall. Preferably cage 21 is positioned adjacent the outlet end of the high pressure cylinder, and wall 26 defines the outer end of the cylinder, as shown more clearly in FIGURE 3.

In the central portion of wall 26 there is provided a grease outlet port 27 of relatively small diameter compared to the diameter of the cylinder. The side of wall 26 facing into the valve cage provides a conical valve seat 28 converging toward port 27. A movable valve 29 extends within cage 21 for closing outlet port 27. Spring means 30 is provided for biasing the valve means 29 to closed position.

Preferably movable valve 29 is illustrated more clearly in FIGURES 4 and 5. The valve comprises an elongated cylindrical member having an enlarged head 31 which extends into valve cage 21 and a reduced shank 32 extending outwardly beyond cage 21. The inner end of head 31 provides a face cooperating with the transversely extending wall 26 of the cage to close outlet port 27 when urged against wall 26. More specifically, face 33 can be of conical configuration to cooperate with the conical valve seat 28 of wall 26 as shown more clearly in FIGURES 2 and 3. With the construction shown, spring means 30 consists of a conical compression spring which has the inner end portion thereof received on shank 32.

In FIGURE 5 there is illustrated a preferred construction of head 31. As shown therein, head 31 is provided with a cylindrical recess 34 which opens toward cage wall 26. A plug 35 of resilient material, such as synthetic rubber, is received in recess 34, and provides a conical face 33a for cooperating with valve seat face 28 to seal port 27. In the illustration given, rubber plug 35 is held within recess 34 by a friction-type fit. It will be understood that plug 35 should be formed of a synthetic rubber which is resistant to grease.

In order to provide for an interlock between shank 32 and spring 30, an annular groove 36 is provided around shank 32 immediately adjacent head 31. The inner end of spring 30 which progressively reduces in diameter is received on shank 32 with the last turn thereof retained in the annular groove 36, as shown more clearly in FIGURES 2 and 3.

The outer portion of spring 30 progressively enlarges in diameter until it achieves a diameter corresponding with the internal diameter of bore portion 22. Bore 22 is internally threaded, as indicated at 37, adjacent the enlarged outer end portion of spring 30. At least the turn of largest diameter of the spring 30 engages the threaded portion 37, as shown in FIGURES 2 and 3. This engagement holds the spring under compression while permitting the spring and valve 29 to be inserted and removed by a threading and unthreading action. To facilitate this operation, the outer end of the spring 30 can be provided with a transversely extending portion 38, as shown in FIGURE 4, the portion 38 permitting the spring to be more easily rotated by means of a tool inserted in the open end of bore 22.

In the illustration given, bore 22 through which the grease flows outwardly communicates with a grease pipe 39 which is threadedly connected to tubular member 12 by means of threads 37, as shown in FIGURES 2 and 3. If desired, pipe 39 can be provided at its outer end with a coupler 40 which is adapted for application to a grease fitting.

It will be understood that the head 31 of the valve 29 should be of smaller diameter than the internal diameter of cage 21, thereby providing an annular passage 41 therebetween for the outflow of the grease, as shown in FIGURES 2 and 3 and also in FIGURE 6. During the dispensing stroke, valve head 31 will be displaced from engagement with valve seat 28, as illustrated in FIGURE 3. The grease will then flow out through port 27 from high pressure cylinder 15, passing around the valve head 31 through the annular flow passage 41, into bore 22 which connects with pipe 39. Preferably, the piston 14 advances to a position with the end thereof in contact with the transversely extending wall 26, and the wall 26 acts as a stop for the advancing movement of the piston. With this arrangement, it is desirable that the piston end and the wall 26 be correspondingly shaped to provide for a positive displacement of the grease from the cylinder. In the illustration given, the end of piston 14 and the inner face of wall 26 are flat, but other corresponding shapes can be used such as a conical shape.

With the construction previously described using the inset valve cage 24, the high pressure cylinder bore 15 can be formed more accurately and to a closer tolerance. Before the insertion of cage 24, bore 15 is finished by passing a broaching tool into the bore.

While in the foregoing specification this invention has been described in relation to a specific embodiment thereof and many details have been set forth for purpose of illustration, it will be apparent to those skilled in the art that the invention is susceptible to additional embodiments than the one specifically illustrated herein and that many of the details described in the foregoing specification can be varied considerably without departing from the basic principles of the invention.

I claim:

1. In combination with a grease gun head including an elongated tubular body having a longitudinal bore extending therethrough with an intermediate portion providing a high pressure cylinder, said cylinder having an inlet end and an outlet end, a grease inlet port extending through the wall of said tubular body adjacent said inlet end, and a piston reciprocating in said cylinder between said inlet and outlet ends, an outlet check valve assembly comprising a hollow cylindrical valve cage seated in said bore adjacent the outlet end of said high pressure cylinder and having an open end facing away from said cylinder, the other end of said valve cage being closed and providing a transversely-extending wall defining the outer end of said cylinder, said wall providing a grease outlet port, a movable valve within said cage for closing said port, said valve being in the form of an elongated cylindrical member having an enlarged head extending into said valve cage and a reduced shank extending outwardly beyond said cage, said head providing a face cooperating with the transversely-extending wall of said cage to close said outlet port when urged against said wall, said shank being provided with an annular groove adjacent said head, and a conical compression spring having its end portion of reducing diameter received on said shank with the last turn thereof retained in said annular groove, the portion of said bore adjacent the enlarged end portion of said conical spring being provided with threads and wherein at least the largest diameter turn of said spring engages the said threads of said bore for holding said spring under compression permitting said spring and valve to be inserted and removed by rotation thereof with respect to said threaded portion.

2. In combination with a grease gun head including an elongated tubular body having a longitudinal bore extending therethrough with an intermediate portion providing a high pressure cylinder, said cylinder having an inlet end and an outlet end, a grease inlet port extending through the wall of said tubular body adjacent said inlet end, and a piston reciprocating in said cylinder between said inlet and outlet ends, an outlet check valve comprising a hollow valve cage in said bore adjacent the outlet end of said high pressure cylinder and having an open end facing away from said high pressure cylinder, the other end of said valve cage being closed and providing a transversely-extending wall defining the outer end of said high pressure cylinder, said wall providing a grease outlet port, a movable valve within said cage for closing said port, said valve being in the form of a member having a head extending into said valve cage and a shank extending outward beyond said cage, said head providing a face cooperating with said transversely-extending wall of said cage to close said outlet port when urged against said wall, a compression spring having one end portion received on said shank and retained thereon, and the other end portion retained under compression and urging said head of said valve to closed position, and means within said bore engaging said other end portion of said compression spring comprising a threaded means and positively securing said other end portion of said spring in said bore whereby the spring and the said valve cooperating with said threaded means can be removed from said cylinder.

3. In combination with a grease gun head including an elongated tubular body having a longitudinal bore extending therethrough with an intermediate portion providing a high pressure cylinder, said cylinder having an inlet end and an outlet end, a grease inlet port extending through the wall of said tubular body adjacent said inlet end, and a piston reciprocating in said cylinder between said inlet and outlet ends, an outlet check valve assembly comprising, a hollow valve cage in said body adjacent the outlet end of said high pressure cylinder and having an open end facing away from said cylinder, the other end of said valve cage being closed and providing a transversely-extending wall defining the outer end of said cylinder, said wall providing a grease outlet port, a movable valve within said cage for closing said port, said valve being in the form of a member having a head extending into said valve cage and a shank extending outwardly, said head of said member providing a face cooperating with said transversely-extending wall of said cage to close said outlet port when urged against said wall, a compression spring having one end portion received on said shank and retained thereon, threads within said bore spaced from said transversely-extending wall and outward thereof, and means within said bore engaging the other end portion of said compression spring comprising thread means engaging said threads within said bore positively securing said other end portion of said spring in said bore, whereby the spring and the said valve cooperating with said threaded means can be removed from said cylinder.

4. The combination of claim 3 wherein said head of said valve is provided with a longitudinally extending recess therein opening toward said wall of said cage, and wherein a plug of resilient material is received in said recess and provides a face for cooperating with said wall to seal said outlet port.

References Cited by the Examiner
UNITED STATES PATENTS

| | | | |
|---|---|---|---|
| 1,287,838 | 12/18 | Benzion | 137—543.17 X |
| 1,654,673 | 1/28 | Barks | 222—340 X |
| 1,801,082 | 4/31 | Hobart | 137—543.17 X |
| 2,183,013 | 12/39 | Davis | 222—340 X |
| 2,711,928 | 6/55 | Randa | 137—543.17 X |
| 2,771,093 | 11/56 | Wilson | 137—543.17 X |

LAURENCE V. EFNER, *Primary Examiner.*

WARREN E. COLEMAN, *Examiner.*